United States Patent
Law et al.

(10) Patent No.: US 12,348,645 B2
(45) Date of Patent: *Jul. 1, 2025

(54) USER DEVICE GATED SECURE AUTHENTICATION COMPUTING SYSTEMS AND METHODS

(71) Applicant: LOGIN ID INC., San Mateo, CA (US)

(72) Inventors: Simon Law, San Mateo, CA (US); Pasan Chankama Hapuarachchi, San Anselmo, CA (US)

(73) Assignee: LOGIN ID INC., San Mateo, CA (US)

( * ) Notice: Subject to any disclaimer, the term of this patent is extended or adjusted under 35 U.S.C. 154(b) by 295 days.

This patent is subject to a terminal disclaimer.

(21) Appl. No.: 17/947,471

(22) Filed: Sep. 19, 2022

(65) Prior Publication Data

US 2023/0020611 A1    Jan. 19, 2023

Related U.S. Application Data

(63) Continuation of application No. 17/188,391, filed on Mar. 1, 2021, now Pat. No. 11,451,401.

(Continued)

(51) Int. Cl.
*G06Q 20/42* (2012.01)
*G06Q 20/02* (2012.01)
*G06Q 20/38* (2012.01)
*G06Q 20/40* (2012.01)

(Continued)

(52) U.S. Cl.
CPC ........... *H04L 9/3247* (2013.01); *G06Q 20/02* (2013.01); *G06Q 20/3825* (2013.01);

(Continued)

(58) Field of Classification Search
CPC ... H04L 63/08; H04L 63/105; H04L 63/0884; H04L 63/0823; H04L 63/101;

(Continued)

(56) References Cited

U.S. PATENT DOCUMENTS

2002/0133467 A1* 9/2002 Hobson ................. G06Q 20/04
                                                        705/64
2015/0294313 A1* 10/2015 Kamal .................. G06Q 20/322
                                                        705/44

(Continued)

FOREIGN PATENT DOCUMENTS

EP         2475194 A1 *  7/2012  ......... H04L 63/0815
WO      2019016222 A1     1/2019

(Continued)

OTHER PUBLICATIONS

Odonnell, Deal financing by suppliers and customers, Mergers & acquisitions, May 1996, vol. 30 (6), p. 24.*

(Continued)

*Primary Examiner* — Ilse I Immanuel

(57) ABSTRACT

A system is provided that allows users to execute a secure transaction that is authenticated by their user device. Personally identifiable information (PII), such as, but not limited to, biometric authentication data, is locally stored on the user's device so as to protect the PII. A user device private key is associated with the particular user device and the user, and the corresponding public key is registered with a User Device Authentication Alliance server (UDAAS) system. In an online transaction, a LoginID server or an Access Control server interact with the UDAAS to confirm the user is authentic and has confirmed the transaction.

22 Claims, 9 Drawing Sheets

Related U.S. Application Data

(60) Provisional application No. 63/056,590, filed on Jul. 25, 2020.

(51) Int. Cl.
*H04L 9/32* (2006.01)
*H04L 9/40* (2022.01)
*G06Q 20/20* (2012.01)
*G06Q 20/32* (2012.01)

(52) U.S. Cl.
CPC ... *G06Q 20/3829* (2013.01); *G06Q 20/40145* (2013.01); *G06Q 20/42* (2013.01); *H04L 9/3236* (2013.01); *H04L 63/0861* (2013.01); *G06Q 20/202* (2013.01); *G06Q 20/321* (2020.05); *G06Q 20/3278* (2013.01); *G06Q 2220/00* (2013.01)

(58) Field of Classification Search
CPC . H04L 9/3234; H04L 2463/082; G06F 21/31; G06F 21/44; G06F 21/33; G06F 12/0868; G06F 21/445; G06F 3/0622
See application file for complete search history.

(56) References Cited

U.S. PATENT DOCUMENTS

| | | | |
|---|---|---|---|
| 2019/0164156 A1 | 5/2019 | Lindemann | |
| 2020/0104841 A1* | 4/2020 | Osborn | G06Q 20/12 |
| 2021/0160081 A1* | 5/2021 | Haring | H04L 9/321 |

FOREIGN PATENT DOCUMENTS

| | | |
|---|---|---|
| WO | 2019186255 A1 | 10/2019 |
| WO | 2020150201 A1 | 7/2020 |

OTHER PUBLICATIONS

International Search Report and Written Opinion dated Dec. 6, 2021, for PCT/US2021/043165 filed Jul. 26, 2021, 21 pages.

Laka, Pawel et al., User perspective and security of a new mobile authentication method, New York; Springer US, Telecommunications Systems, Mar. 16, 2018, vol. 69 (3), p. 365-379.

* cited by examiner

USER DEVICE GATED SECURE AUTHENTICATION COMPUTING SYSTEMS AND METHODS

CROSS-REFERENCE TO RELATED APPLICATION

This patent application is a Continuation of U.S. patent application Ser. No. 17/188,391 filed on Mar. 1, 2021, and titled "User Device Gated Secure Authentication Computing Systems And Methods"; which claims priority to U.S. Provisional Patent Application No. 63/056,590 filed on Jul. 25, 2020, and titled "User Device Gated Secure Authentication Computing Systems And Methods"; and the entire contents of which are herein incorporated by reference.

TECHNICAL FIELD

The following generally relates to secure authentication computing systems and methods that are gated by a user device.

DESCRIPTION OF THE RELATED ART

People interact with computing platforms over the Internet to perform actions, such as transactions. These actions include authenticating a person using their credentials, confirming information, and receiving authorization for the transaction. Entities involved in the transaction, such as a payment network, a merchant, and the user need to verify that the information is correct. A payment network and a merchant also need to verify that transaction is authorized by the user, and not from an adversary (e.g., a fraudulent actor). Conversely, the user needs to also verify that intent of the transaction, as well as the accuracy of the information related to the transaction.

It is herein recognized that these existing systems do not provide enough user authentication. In particular, fraud in credit card transactions is rampant. Bad actors use stole credit card numbers, stolen user information (e.g., name, address, etc.) to make fraudulent payments. Using existing system, this relatively easy to steal information can be used to make transactions. Furthermore, bad actors can easily provide intent to make a transaction, such as by simply providing this stolen data and hitting a payment button.

It is also herein recognized that the transaction system is disjointed. This leads to merchants and users getting into disputes about amounts and transaction details.

It is also herein recognized that online stores currently utilize user passwords to help authenticate a user for a transaction. However, passwords are not effective as they can be stolen. Furthermore, many different password accounts can use different payment credentials, so there is not strong link between passwords and user authentication of a transaction.

It is also herein recognized that there is a growing effort by regulatory bodies for to address the lack of proper authentication in transactions, such as, but not limited to the Payment Services Directive 2 (PSD2).

The above problems, amongst other challenges, make it difficult to facilitate user authenticated transactions via websites, apps, user accounts, etc. in a scalable manner.

BRIEF DESCRIPTION OF THE DRAWINGS

Embodiments will now be described by way of example only with reference to the appended drawings wherein.

DETAILED DESCRIPTION

Figure 1:
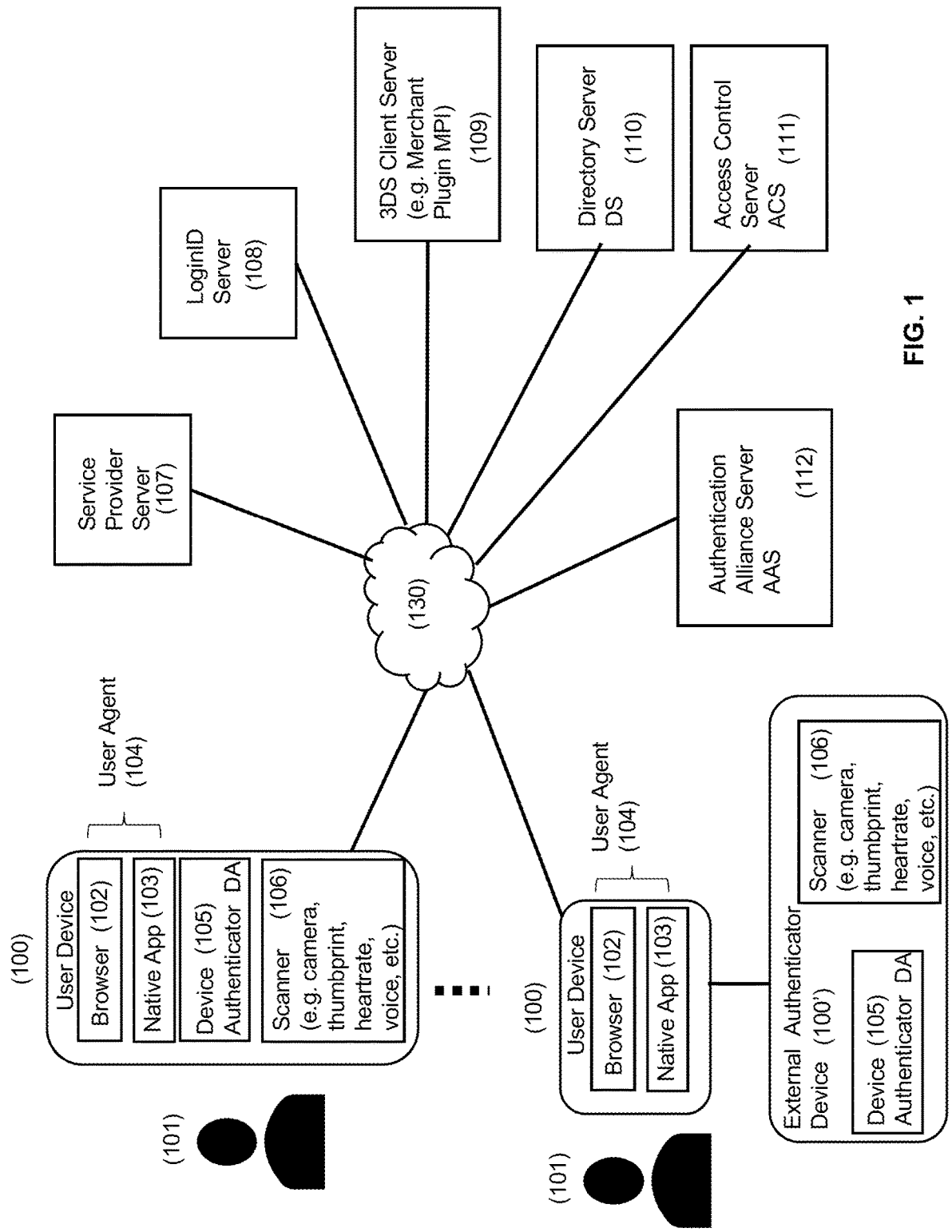
FIG. 1 is a schematic diagram of an example of a system of user devices and server systems that include, for example, a LoginID server, a Directory server, an Access Control server and a User Device Authentication Alliance server.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

In an example embodiment, a system is herein provided that allows card issuers, merchants, and user devices to securely authenticate transactions. In an example aspect, the data about a user is securely stored on a user device in a device authenticator. The device authenticator acts as a gate mechanism that for user authentication of a transaction. The user authentication process includes an exchange of data between the user device and the LoginID server. The other computing entities of the card issuers, merchants, and user devices securely and reliably obtain the user authentication using the LoginID server.

In an example aspect, Fast Identity Online (FIDO) protocols using biometric authentication are executed by the user device and the LoginID server to provide user authentication of a transaction. In another example aspect, WebAuthn is used to implement the transaction authentication.

In an example aspect, the user provides direct authentication at a per transaction level, via a secure user device with a device authenticator.

In an example aspect, the issuer (e.g., banks that issue a payment card), payment network and merchant can verify that a transaction was authorized by the user in a coordinated manner.

In an example aspect, the user, the issuer, the payment network and the merchant can all verify accuracy of transaction information.

In an example aspect, no password is required for the transaction.

In another example aspect, the data transmitted between the parties is secure.

Turning to FIG. 1, the computing architecture includes one or more users 101 and their user devices 100. Examples of user devices include mobile devices, laptops, desktop computers, tablets, smart phones, etc. A user device 100 has a processor, memory, a communication module (e.g., for communicating via a cell network, WiFi, LAN, WAN, etc.), and a user interface (e.g., display screen, touch interface, keyboard, mouse, etc.). In an example aspect, the user device 100 includes a browser 102, or a native application (also called an app) 103, or both. The browser 102 or the native app 103, or both, are more generally herein referred to as the user agent 104.

The user device also has a device authenticator (DA) 105, which is used to store user-identifying data on the device a secure manner and to authenticate the user. The user device may also include a scanner 106, such as a camera, a thumbprint scanner, a heartrate monitor, a microphone for voice detection, etc. In an example aspect, the device authenticator 105 includes a secure execution and secure storage environment, which can be implemented using one or more of: a Trusted Execution Environment (TEE); a secure element, a firewall; a software layer; a secure enclave; a Hardware Secure Module (HSM); etc. It will be appreciated that a TEE is a computing chip that, for example, exists on a processor device. It will be appreciated that a HSM is a separated computing appliance. Authentication data about a user 101 can be stored in the device authenticator. The authentication data about the user, for example, includes a device authentication private key (also referred to as a DA private key) associated with the user 101 and the device authenticator 105 of the device 100. In an example aspect of using a FIDO protocol, the DA private key is known as a FIDO private key. The device authenticator may also store other data, including, but not limited to: biometric authentication data, passwords, security codes, name, address, account numbers (e.g., like a primary account number (PAN), driver's license number, etc.), age, date of birth, citizenship, credentials, etc.

The device authenticator, for example, interacts with a scanner 106 to obtain identifying data about the user, and compares the scanned identifying data about the user with stored identifying data about the user. For example, the identifying data about the user is biometric authentication data, including and not limited to one or more of: fingerprint scan, eye scan, facial recognition, voice recognition, heartbeat or pulse monitoring, DNA sampling, body temperature, etc. The scanner 106 includes one or more sensors that can capture the biometric authentication data.

In other words, the device authenticator stores first biometric authentication data, such as during a setup process. To verify a transaction, the scanner is used to obtain the user input verification, which comprises second biometric authentication data. The device authenticator compares the second biometric authentication data with the first biometric data, which is already stored on the device authenticator. A successful match of the data leads to the device authenticator verifying transaction data.

In some example embodiments, the processes described herein use a scanner 106. In other example embodiments, the processes described herein do not use a scanner 106, and the identifying data about the user is submitted through other interfaces. It will also be appreciated that the identifying information about the user can data that is not biometric in nature.

In an example embodiment, the device authenticator 105 and the scanner 106 are built into the user device 100.

In another example embodiment, the device authenticator 105 and the scanner 106 are part of an external authenticator device 100'. The user device 100 and the external authenticator device 100' are in data communication with each other. For example, the external authenticator device 100' is connected to the user device 100 via a wire or some other electrical connection (e.g., universal serial bus (USB)). In another example, the external authenticator device 100' is connected to the user device 100 via wireless communication. Examples of wireless communication include the Bluetooth, Near Field Communication, and WiFi. Example embodiments of an external authenticator device 100' include a smart watch, a USB key, a dongle, and a smart phone.

The one or more user devices 100 are in data communication with a data network 130. The system also includes other servers 107, 108, 109, 110, 111 and 112, which are also in data communication with the data network 130. A "server" herein refers to a computing system that can include one server computer or multiple server computers that are networked to operate together. A server includes one or more processors, memory, and a data communication module. A server also includes software and other logic modules for storing data and executing instructions.

The service provider server 107 is operates an interface for conducting operations with the user device 100. For example, the service provider server 107 is a relying party that relies on the data verification and user authentication provided by the other servers. The service provider server, for example, is a merchant or some other party that wishes to process a transaction with the user 101. The service provider server 107, for example, has a website on which the user wishes to execute a transaction. In another example, the service provider 107 is connected to an intermediary device (not shown), such as a point-of-sale terminal, point-of-sale device, virtual cash register, automated teller machines, electronic cash registers, hand-held specialized readers, etc. The user device is in data communication with the intermediary device, which in turn interacts with the service provider server 107. It will be appreciated that examples that describe the service provider 107 and the user device 100 interacting with each other can include embodiments without an intermediary device and embodiments with an intermediary device. In some embodiments, the service provider server provides a physical good, digital good, or service in return for a successful transaction with the user. In other cases, a transaction can be provided without an exchange (e.g., for donations, for giveaways, etc.).

The LoginID server 108, also herein interchangeably called a LID server and an attestation server, executes processes that attest to the transaction being requested.

The 3DS client server 109 is an intermediary party between external parties that wish to contact the directory server 110 and access control server 111. The 3DS client server 109 includes a merchant plugin (MPI). In another example, the 3DS client 109 is a processing network of computers that provide authorization services, and clearing and settlement services for transactions. A processing network of computers may include data processing subsystems, networks, and operations used to support and deliver authorization services, exception file services, and clearing and settlement services. An example of a payment processing network is available under the tradename VisaNet™. Payment processing networks such as VisaNet™ are able to process credit card transactions, debit card transactions, and other types of commercial transactions.

A directory server 110 includes a directory (e.g., a look-up a database) of access control servers and accordingly routes messages in a transaction system. In an example embodiment, the messages routed by the directory server may include enrollment and authentication information between a merchant plugin and an issuer access control server. The directory server can also determine whether an account can utilize the authentication services. In some embodiments, the directory server can be operated by a transaction service provider. According to various embodiments, the directory server may also have the ability to tokenize account data or may de-tokenize tokens.

An access control server 111 executes verification processes to verify a transaction for a user or service provider wanting to make an online transaction. In another example aspect, an access control server performs requested authentication services for issuers or other entities, and provide digitally signed responses to entities requesting authentication. An access control server may be shared or used by multiple entities.

An Authentication Alliance Server (AAS) 112 is a signing service that stores public keys for entities, such as the LoginID server 108. In other words, it stores the LoginID public key, and signs it using the AAS private key. The corresponding AAS public key is available to entities, such as the access control server and the directory server. In an example aspect, the AAS 112 is a Fast Identity Online (FIDO) Alliance Server that stores public keys of certified entities, such as the LoginID server 108.

It will be appreciated that there may be multiple instances of each of servers. For example, different instances of a server store different data, or are located in different geographical regions, or both.

FIGS. 2 to 9 show example executable processes for verifying a transaction that includes a user device providing verification. In these examples, an initial condition is already established that includes a device authentication private key being securely stored on the device authenticator 105, and the corresponding device authentication public key being stored on the LoginID server (also herein called an attestation server or LID server) 108. The generation and storage of these keys, for example, adhere to the FIDO protocols developed by the FIDO Alliance (www.fidoalliance.com). In an example aspect, the device authenticator generates the device authenticator private key and the device authenticator public key, and the device authenticator sends the device authenticator public key to the LoginID server 108 for storage. The device authentication private key can be used to sign responses that include transaction details.

Figure 2:
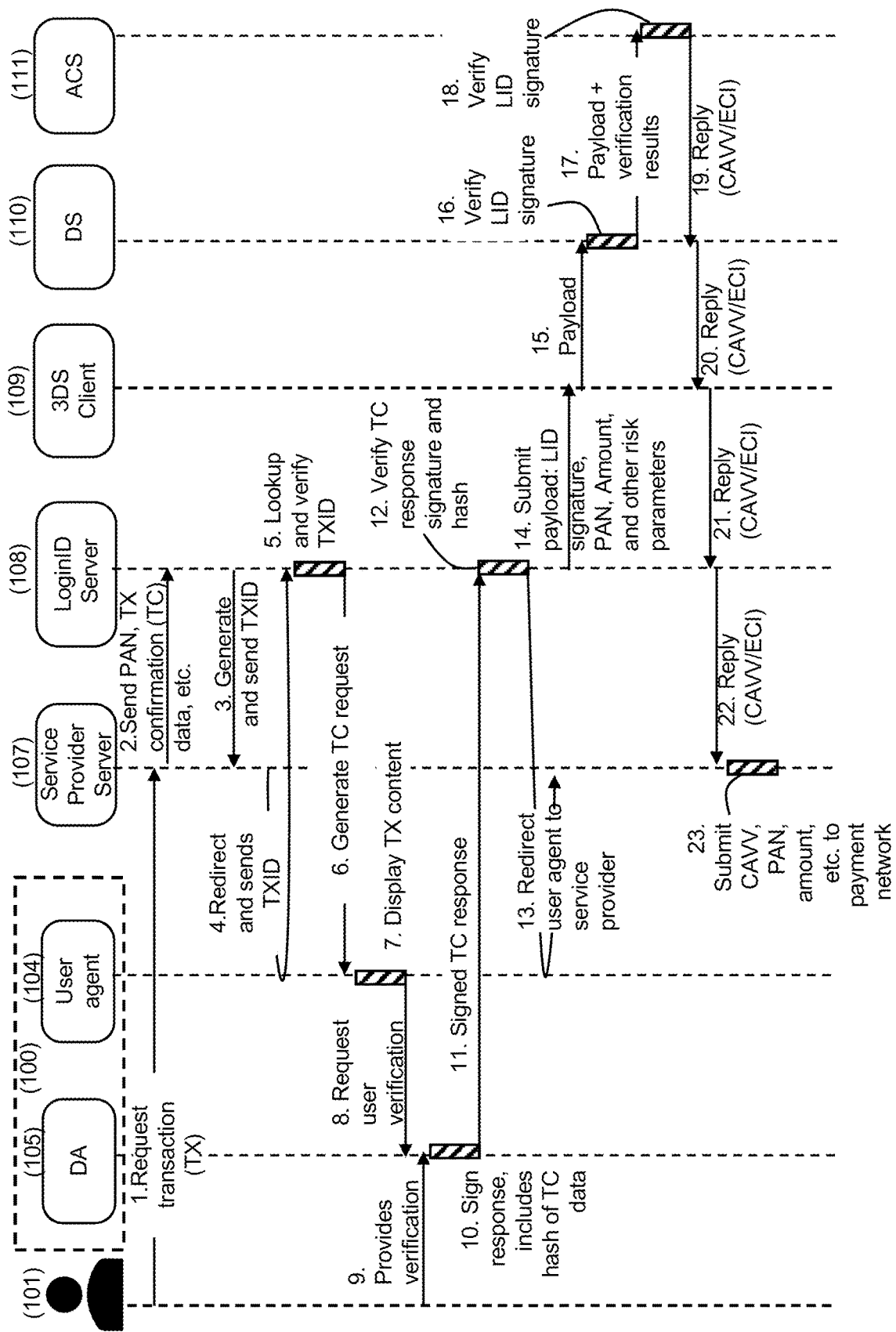
FIG. 2 is a flow diagram of computer executable or processor implemented instructions for authenticating a user device and verifying a transaction using a LoginID (LID) signature, and the LID server interacting with a 3DS client, according to an example embodiment.

Turning to FIG. 2, at Operation 1, the user 101, via their user device 100, sends a request for a transaction to the service provider server 107. In an example aspect, if the service provider server does not already have the PAN and other user details, then the request includes the PAN and other user details. In an example embodiment, the user agent (e.g., a web browser or a native app) interacts with the service provider server, or an intermediary device (not shown).

At Operation 2, the service provider server sends a PAN, or an alias of the PAN, or a token representing the PAN. The service provider server also sends along transaction confirmation data to the LoginID server 108. Transaction confirmation data include one or more of: service provider name (merchant name), amount, currency, date, shipping address if applicable, receipt destination (e.g., email or digital user account for digital service or digital goods), etc. In an example aspect, the transaction confirmation data include the PAN or a token representing the PAN.

At Operation 3, the LoginID server (also called the attestation server) generates a transaction ID that corresponds to the received transaction data at Operation 2, and the LoginID sends the transaction ID to the service provider server.

At Operation 4, the service provider server redirects the user agent to the LoginID server, and also sends the user agent the transaction ID.

At Operation 5, the LoginID server receives the transaction ID from the user agent. The LoginID searches its database and verifies if the transaction ID provided by the user agent matches its own records. If there is a match, the process continues to Operation 6.

At Operation 6, the LoginID server generates and sends a transaction confirmation request to the user agent.

At Operation 7, the user agent displays the transaction content for the user to review. The transaction content includes, for example, the name of the service provider or merchant, the product or service being purchased, the amount of money, shipping address if applicable, destination receipt, etc. In an example aspect, the transaction content also includes the payment method (e.g., PAN, or an alias of the PAN)

At Operation 8, the user agent requests the user to provide verification. This includes activating the device authenticator.

At Operation 9, the user interacts with the device authenticator and provides his/her user verification to approve the transaction. For example, the user presses a fingerprint scanner to provide verification. In another example, the user completes a facial ID scan to provide verification. In another example, the user completes a biometric authentication process using the scanner. It is appreciated, for example, that biometric authentication data obtained in Operation 9 is compared with biometric authentication data that is already stored on the device authenticator. In another example, the user presents a unique identifier, that is not biometric related. After verification is successfully completed, the device authenticator signs a response.

At Operation 10, the device authenticator uses the device authenticator private key to sign a response. The response includes a value derived from transaction confirmation data.

For example, the value is a hash of the transaction confirmation data. Other approaching for deriving the value from the transaction confirmation data are applicable to the principles described herein.

At Operation 11, the device authenticator sends the signed transaction confirmation response to the LoginID server.

At Operation 12, the LoginID server verifies the signature of the transaction confirmation response and the value derived from the transaction confirmation data. For example, the LoginID server has the device authentication public key that corresponds to the device authentication private key used to sign the response at Operation 10.

At Operation 13, after the signature and the value, which is derived from the transaction confirmation data, are verified, then the LoginID server redirects the user agent to the service provider server.

In an example aspect, the LoginID server also sends a transaction confirmation token indicating the transaction is verified by the LoginID server. In another example aspect, the service provider server sends the transaction confirmation token to the LoginID server, so that the LoginID server can verify the token.

At Operation 14 (which can occur either in parallel with Operation 13, or before or after Operation 13), the LoginID server submits a payload to the 3DS client server. The payload includes, for example, a LoginID signature (also herein interchangeably called a "LID signature" and an attestation signature) associated with the transaction and the transaction confirmation data (e.g., the PAN, the amount, the billing address, and other risk parameters). Examples of risk parameters include: operating system and version of the user device, IP address of the user device, location of the user device, make or model of the user device, etc. The LID signature is generated by the LoginID server after verifying the device authenticator signature and the value derived from the transaction confirmation data. The LoginID generates the LID signature using a LoginID server private key. The corresponding LoginID server public key is available to the directory server or the access control server, or both, so that either or both entities can verify the LID signature.

At Operation 15, the 3DS client sends the payload to the directory server.

At Operation 16, the directory server verifies the LID signature, for example, using the LoginID server public key.

At Operation 17, the directory server sends the online authentication process message including the PAN, the shipping address if applicable, the transaction data, the LID signature, and the verification results to the access control server.

At Operation 18, the access control server optionally verifies the LID signature, either in addition or in alternative to verification executed at Operation 16. The access control server then generates an online authentication process reply message. The online authentication process reply message may include a cardholder authentication verification value (CAVV) and an electronic commerce indicator (ECI). In an example aspect, the ECI is associated with an e-commerce transaction and it represents a value determined by the access control server. In cases where the transaction is successfully verified or attempted, then the access control server provides the ECI to the 3DS client. In an example aspect, the access control server sets an acknowledgement value within the CAW to acknowledge that the access control server has received data from the LoginID server that has pre-verified the transaction. This acknowledgment value may signal to a party as to which entity (e.g., the LoginID server) has performed a higher trust level of authentication.

At Operations 19, 20, 21 and 22, the access control server sends a reply to the directory server that includes the PAN, the ECI and the CAVV. This response is passed on to the 3DS client server, then to the LoginID server, and then to the service provider server. The response is encrypted using channel level encryption (e.g., TLS) and can be decrypted by the relevant entities on the channel. In another example embodiment, such as shown in Operation 21 in FIG. 8 and FIG. 9, the 3DS client transmits the response directly to the service provider server. It will be appreciated that the service provider server can receive the response from the LoginID server 108 or the 3DS client server 109, or both.

At Operation 23, the service provider server transmits an authorization request message including the CAVV, the ECI, the PAN, the payment amount, etc. to a payment network to authorize the transaction. At the end of the day or at some later time, a clearing and settlement process can take place.

Figure 3:
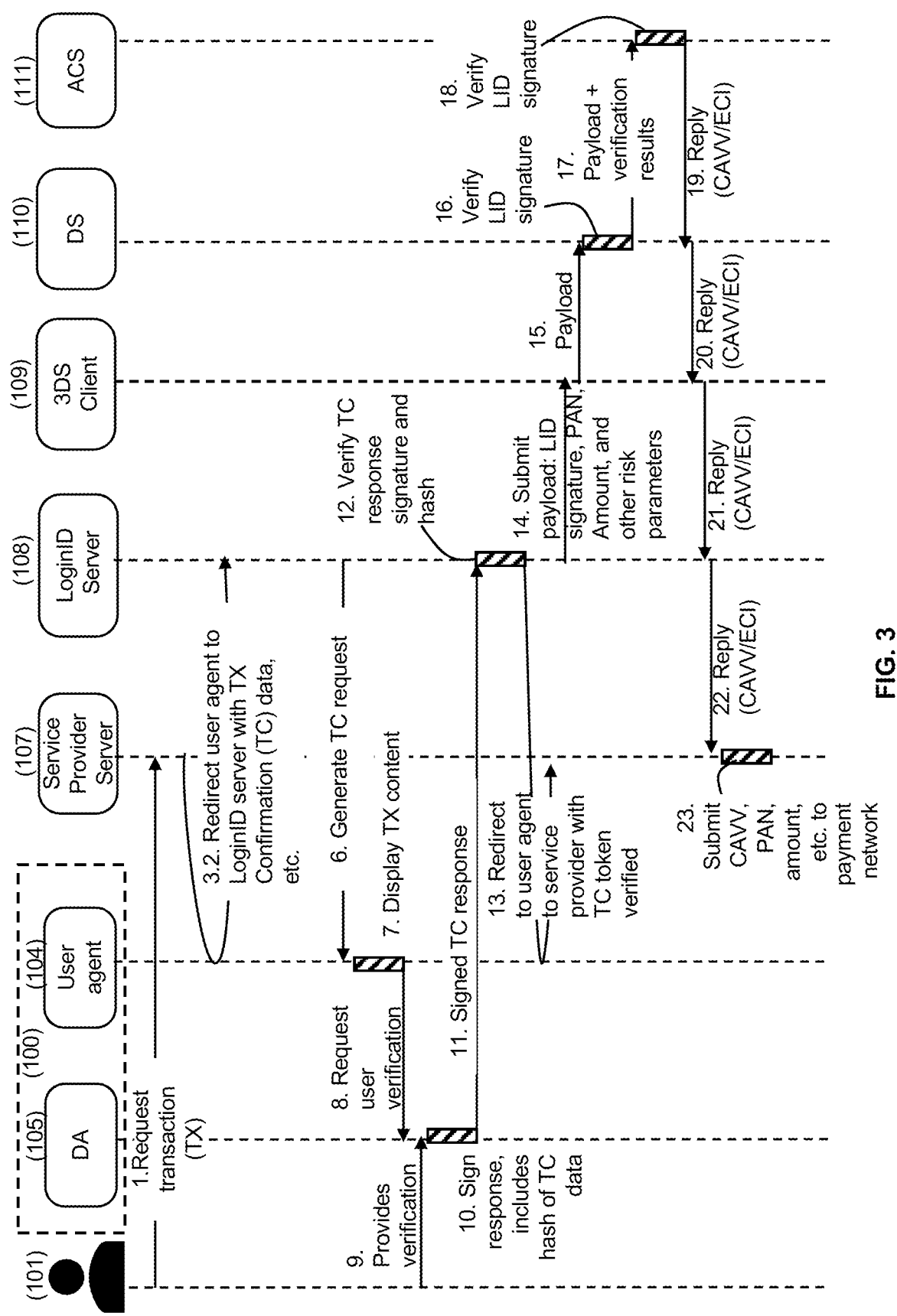
FIG. 3 is a flow diagram of computer executable or processor implemented instructions for authenticating a user device and verifying a transaction using a LID signature, and the LID server interacting with a 3DS client, according to another example embodiment.

Turning to FIG. 3, the operations in FIG. 3 are almost the same as the operations in FIG. 2. However, Operations 2 to 4 in FIG. 2 are instead replaced with Operation 2.3 in FIG. 3. In Operation 2.3 in FIG. 3, the service provider server redirects the user agent to the LoginID server. Further, the service provider server sends the transaction confirmation data, risk parameters, etc. via the redirect of the user agent to the LoginID server.

Figure 4:
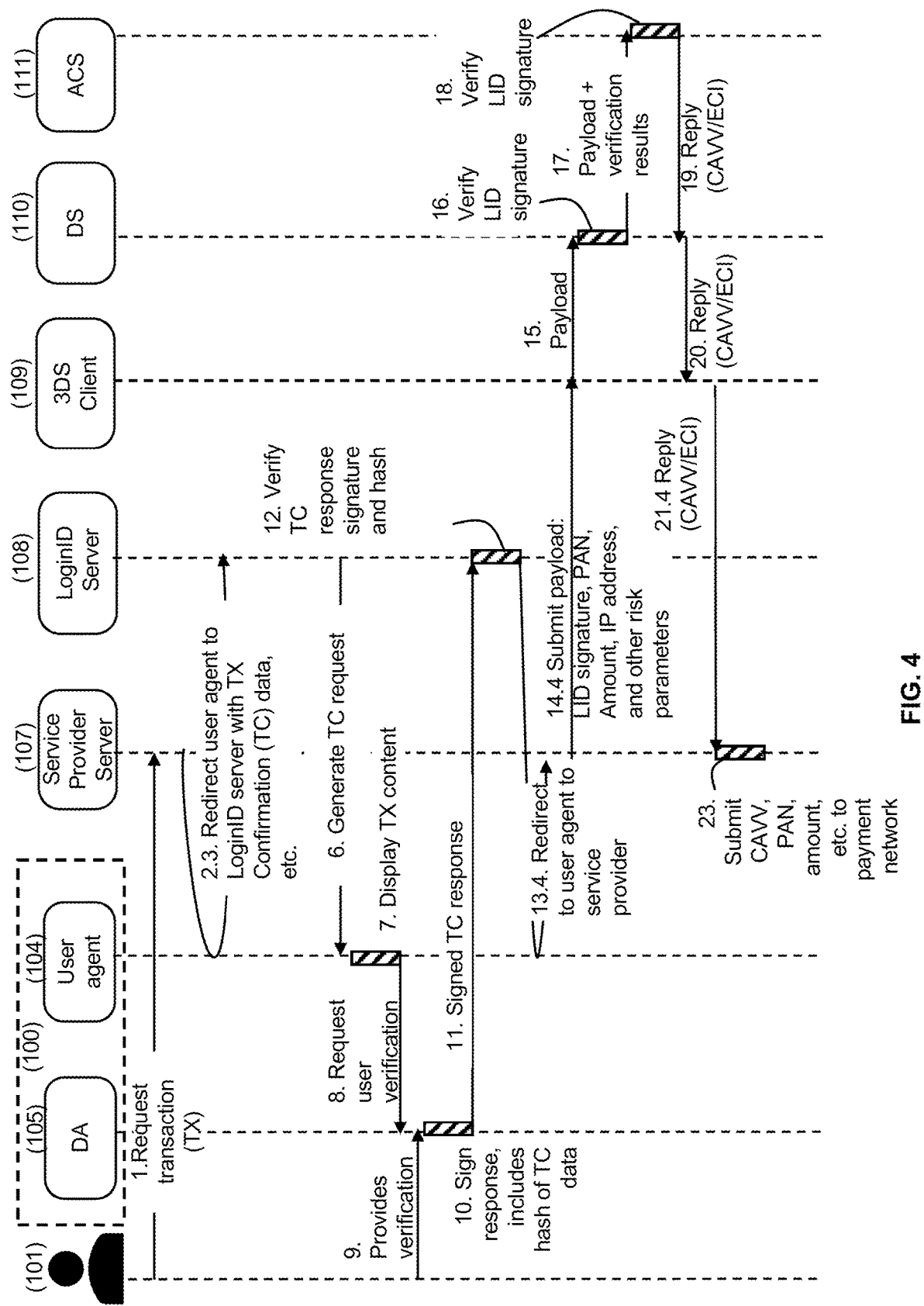
FIG. 4 is a flow diagram of computer executable or processor implemented instructions for authenticating a user device and verifying a transaction using a LID signature, and the service provider server interacting with a 3DS client, according to another example embodiment.

Turning to FIG. 4, another example embodiment is provided that is similar to FIG. 3. However, in FIG. 4, the LoginID server sends it LID signature to the service provider server, and the service provider server submits the payload and the LID signature to the 3DS client.

In particular, after Operation 12, the LoginID server generates a LID signature, and it redirects the user agent to the service provider, as per Operation 13.4. The LoginID server also provides the service provider server with the LID signature. At Operation 14.4, the LoginID server then submits a payload to the 3DS client. The payload includes, for example, the LID signature, the PAN, the payment amount, and other risk parameters.

In FIG. 4, after the reply is provided by the access control server, the reply is sent to the directory server (Operation 19), then to the 3DS client (Operation 20), and then to the service provider server (Operation 21.4).

Figure 5:
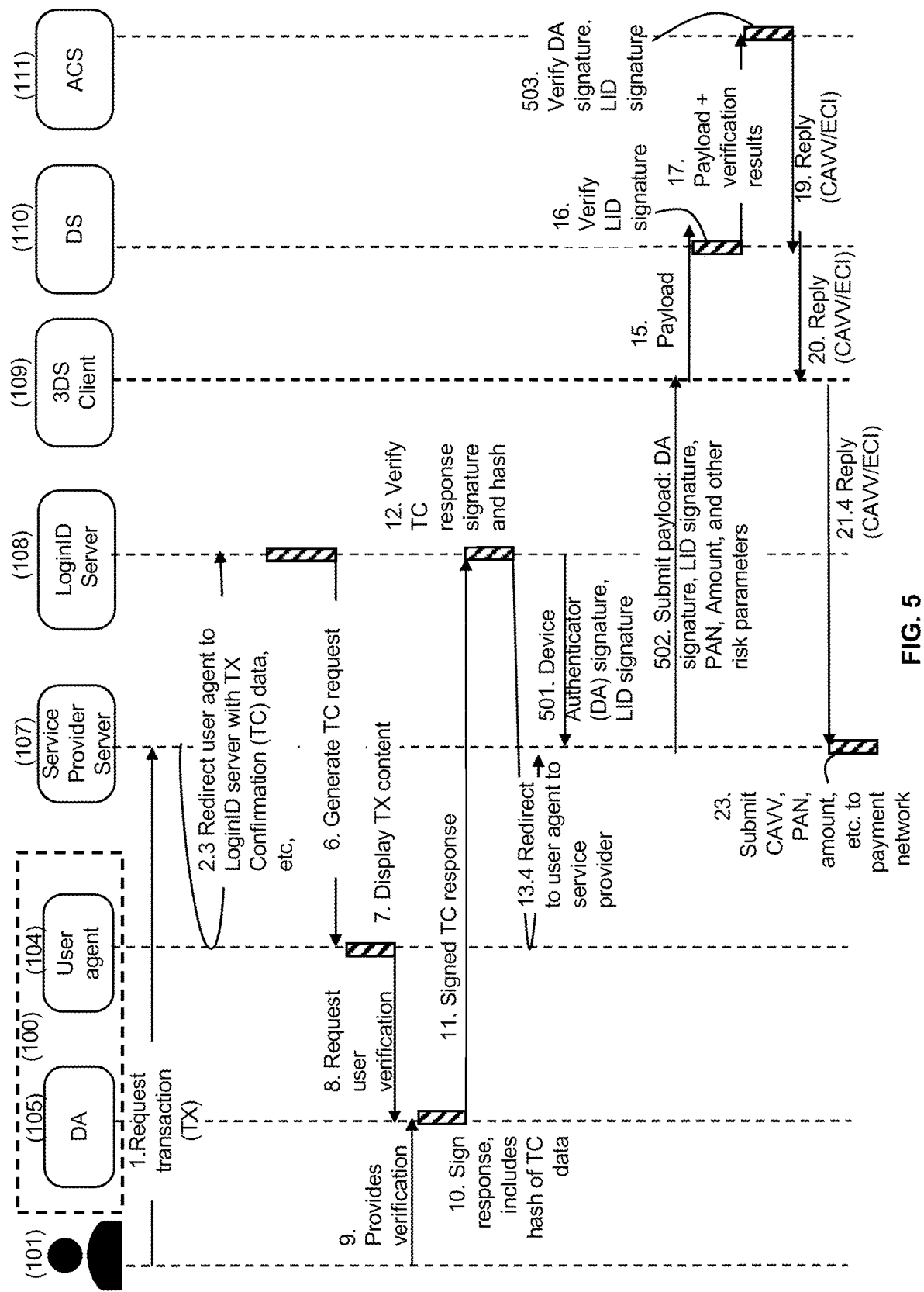
FIG. 5 is a flow diagram of computer executable or processor implemented instructions for authenticating a user device and verifying a transaction using a Device Authenticator (DA) signature and a LID signature, and the service provider server interacting with a 3DS client, according to another example embodiment.

Turning to FIG. 5, another example embodiment is provided in which the device authenticator signature, which was generated at Operation 10, is sent to the access control server for verification.

After Operation 12, the LoginID server sends the device authenticator signature and the LID signature to the service provider server (Operation 501). In an example aspect, the device authenticator signature is signed by the LID signature. In this way, the device authenticator signature is attested to by the LoginID server.

Alternatively at Operation 501, the LoginID server uses its private key to sign the device authenticator public key, which becomes the LID signature. In this way, the device authenticator signature is attested to by the LoginID server.

At Operation 502, the service provider server submits a payload to the 3DS client. The payload includes the DA signature and other data (e.g., PAN, amount, IP address, etc.). In an example embodiment, the LID signature is included in the payload; in another example, the LID signature is not included in the payload.

This data is transmitted to the access control server. At block 503, the access control server verifies the device authenticator signature. For example, the access control server has access to the corresponding device authenticator public key, provided by the LoginID server. Optionally, the access control server also verifies the LID signature using a public key of the LoginID server.

Figure 6:
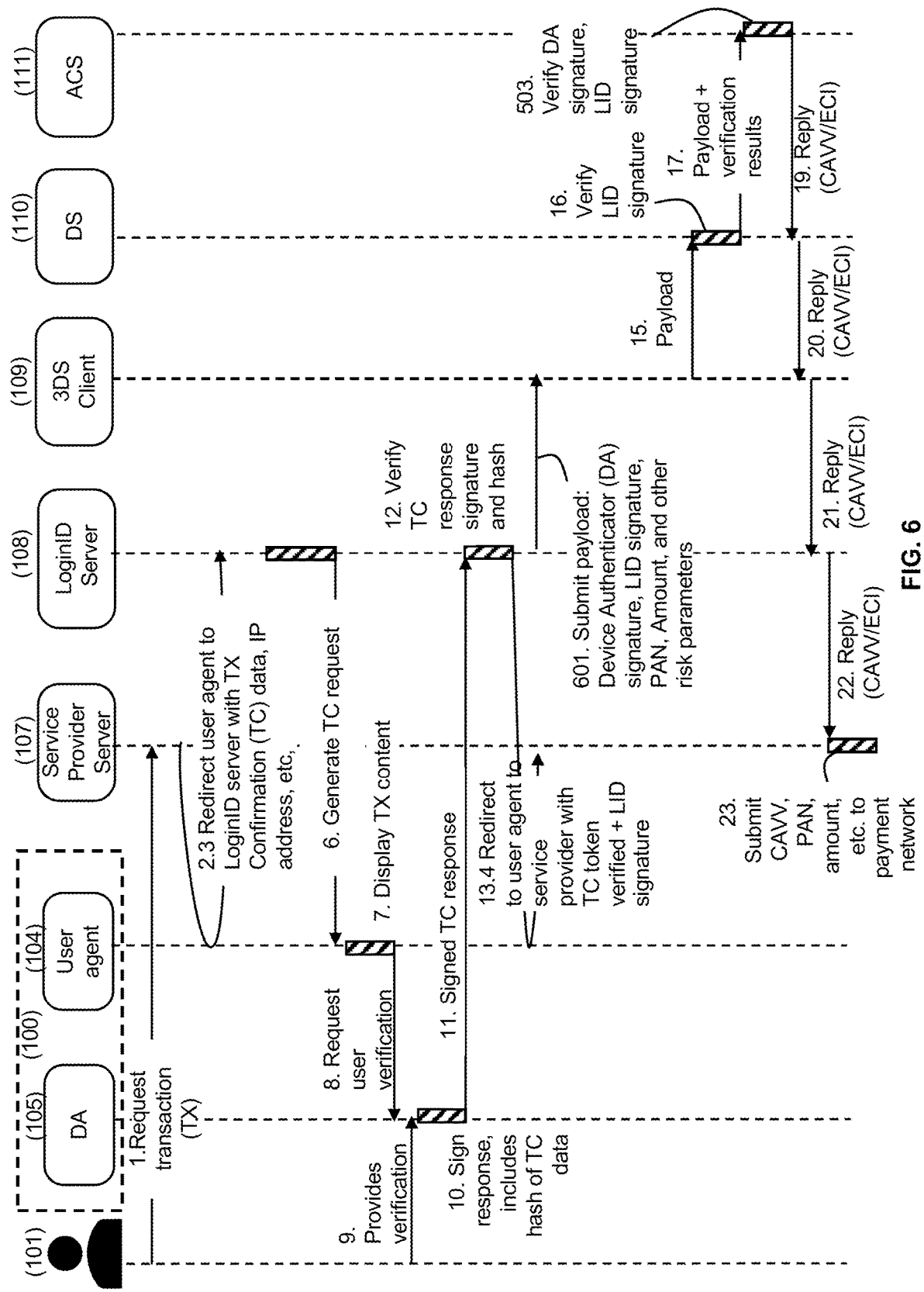
FIG. 6 is a flow diagram of computer executable or processor implemented instructions for authenticating a user device and verifying a transaction using a DA signature and a LID signature, and the LID server interacting with a 3DS client, according to another example embodiment.

Turning to FIG. 6, the example process shown here is very similar to the process shown in FIG. 5. However, in FIG. 6, the LoginID server directly submits the payload to the 3DS client. In particular, at Operation 601, the LoginID server signs the device authenticator signature, and includes this in the payload.

Figure 7:
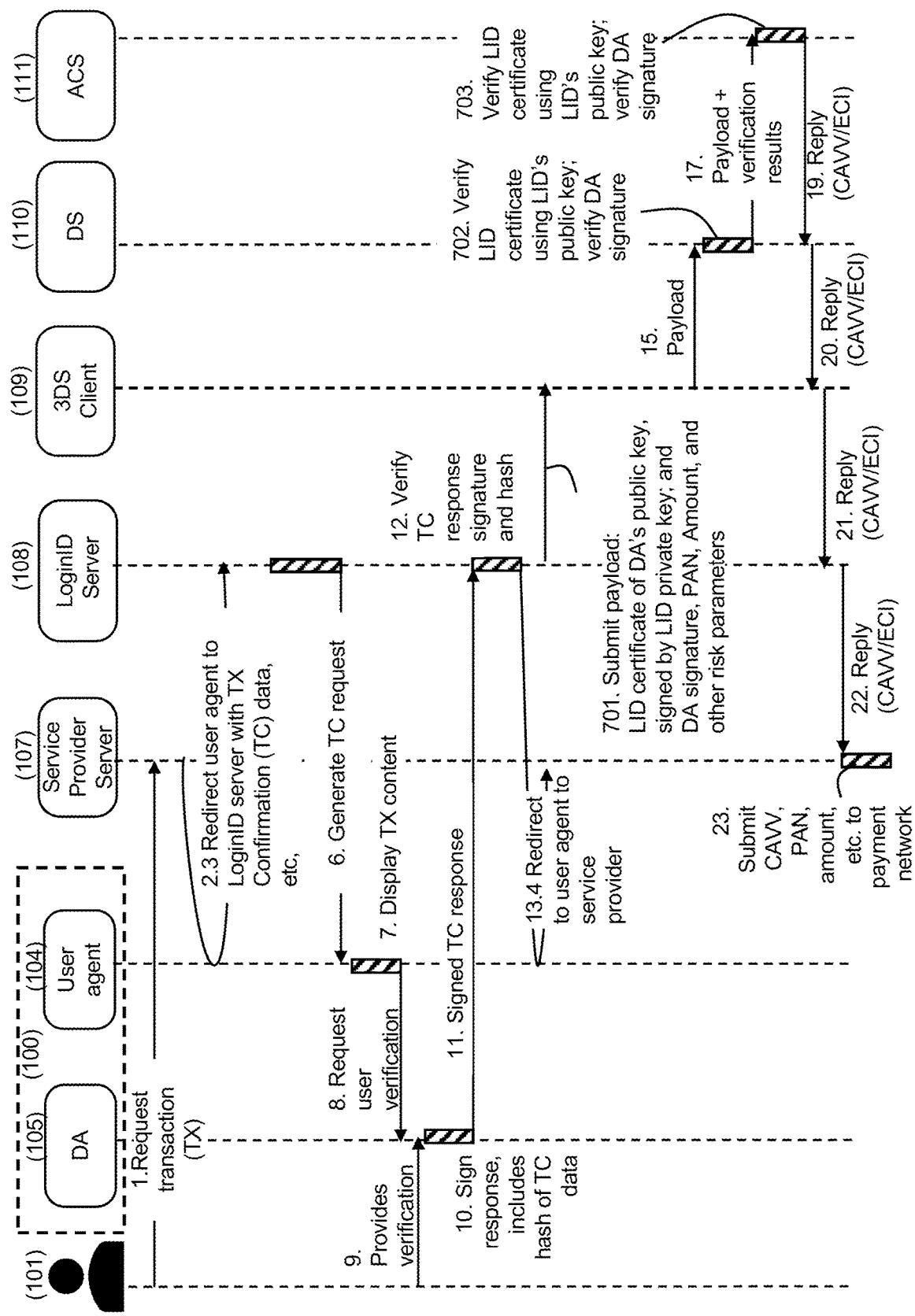
FIG. 7 is a flow diagram of computer executable or processor implemented instructions for authenticating a user device and verifying a transaction using a DA signature and LID certificate, and the LID server interacting with a 3DS client, according to another example embodiment.

Turning to FIG. 7, another example process is shown that is similar to the above processes. In FIG. 7, the public key of the device authenticator, which is used to verify the device authenticator signature, is not directly accessible to the access control server or the directory server, or both. Therefore, the LoginID server, which does have access to the public key of the device authenticator, provides the public key of the device authenticator to the access control server. In particular, the LoginID server wraps the public key of the device authenticator in a certificate signed by the LoginID server private key. This certificate is herein called the "LID certificate" or "attestation certificate". The access control server, or the directory server, or both, have access to the corresponding LoginID server public key to verify the certificate. In this way, the access control server has confidence that the public key of device authenticator is authentic, because the LoginID server has certified its authenticity.

For example, in FIG. 7, after Operation 12, the LoginID server issues a LID certificate that includes the device authenticator public key, and the certificate is signed by the private key of the LoginID server. For example, the LID certificate is a X.509 certificate. At Operation 701, the LoginID sends the LID certificate, as well as a payload that includes: the device authenticator signature, the PAN, the payment amount, and risk parameters. The LoginID server sends the certificate and the payload to the directory server, which then transfers it to the access control server. Either the directory server of the access control server, or both, verify the certificate using the LoginID server's public key (Operations 702 and 703).

In an example embodiment, the access control server at Operation 703 uses the LoginID server's public key to verify the LID certificate. After the LID certificate (which holds the device authenticator public key) is verified, the access control server uses the device authenticator public key to verify the device authenticator signature. The access control server also verifies the transaction data (e.g., PAN, amount, risk parameters, etc.).

The operation of verifying the LID certificate and verifying the DA signature can be executed at either the directory server or the access control server, or both.

Figure 8:
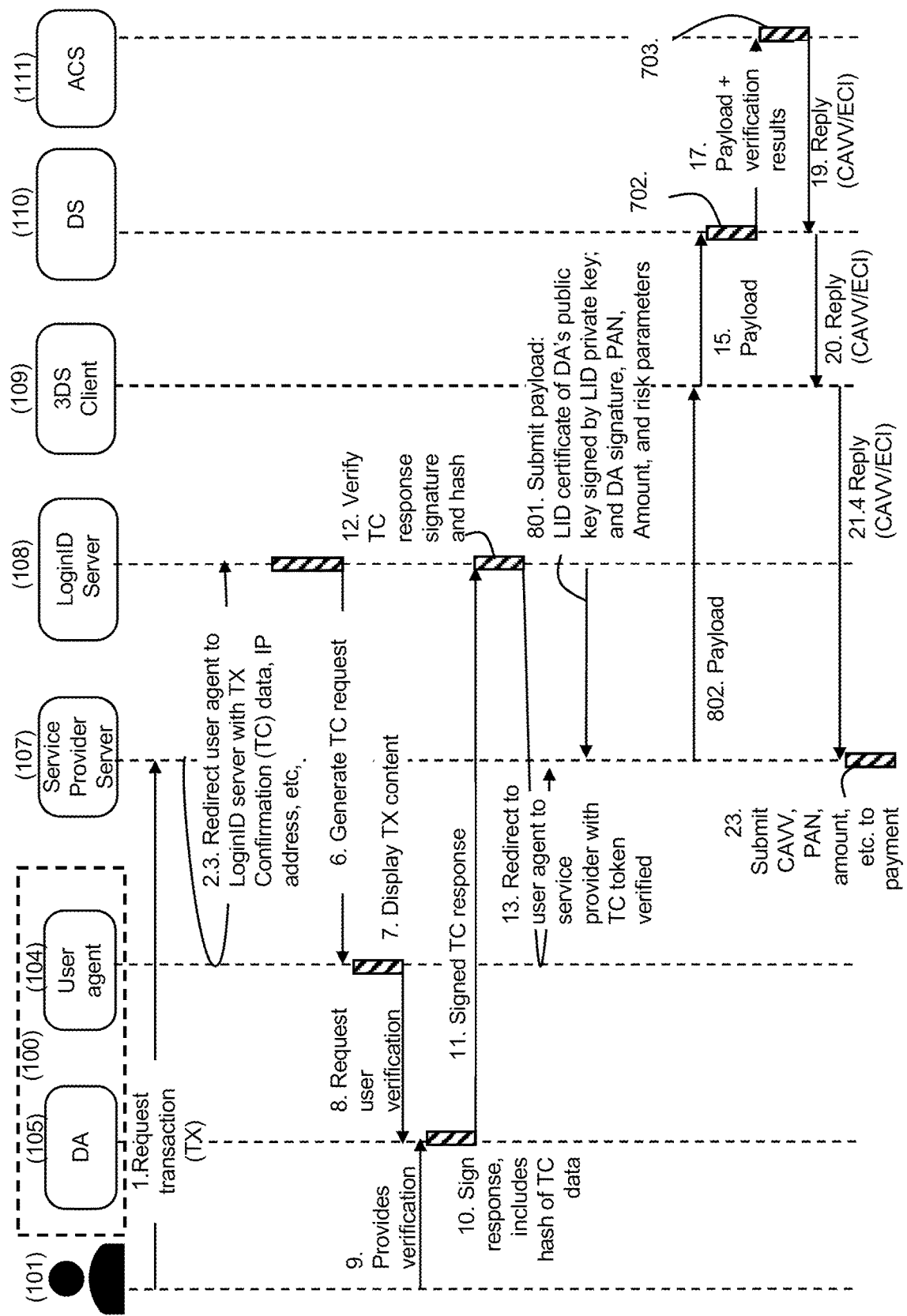
FIG. 8 is a flow diagram of computer executable or processor implemented instructions for authenticating a user device and verifying a transaction using a DA signature and LID certificate, and the service provider server interacting with a 3DS client, according to another example embodiment.

Turning to FIG. 8, a similar example embodiment is provided compared to FIG. 7. A LID certificate is used by the LoginID server to transport the public key of the device authenticator to the access control server or the directory server, or both. However, in FIG. 8, the service provider server interacts with the 3DS client rather than the LoginID server.

In particular, after Operation 12, the LoginID server generates a LID certificate that includes the device authenticator public key, and the certificate is signed the private key of the LoginID server. At Operation 801, the LID certificate and a payload of the DA signature, PAN, amount of payment, and other transaction data are sent to the service provider server. The service provider server, at Operation 802, submits a payload to the 3DS client.

At Operation 21 in FIG. 8, the 3DS client transmits the response directly to the service provider server. It will be appreciated that the service provider server can receive the response from the LoginID server 108 or the 3DS client server 109, or both.

Figure 9:
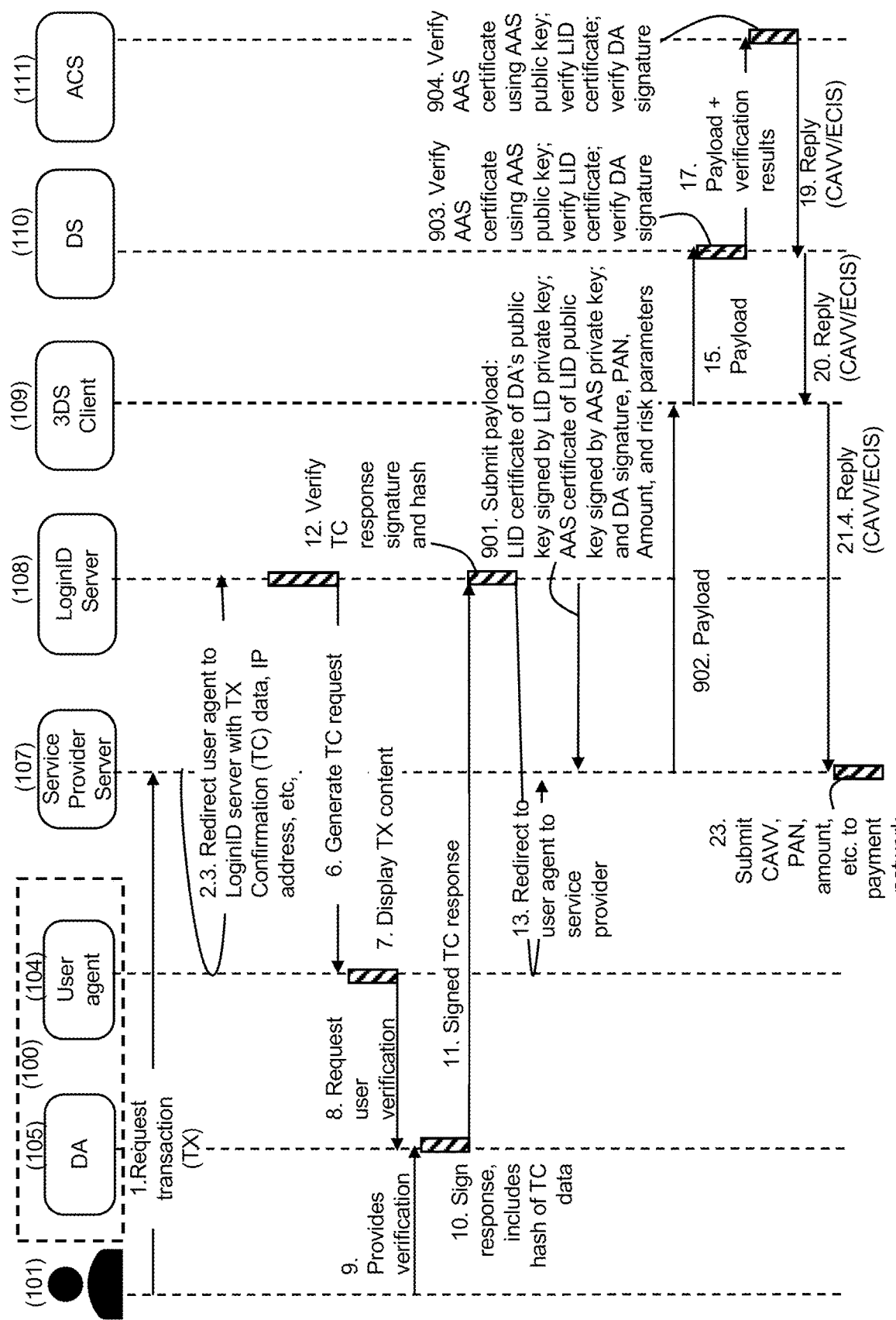
FIG. 9 is a flow diagram of computer executable or processor implemented instructions for authenticating a user device and verifying a transaction using chain of keys, including a User Device Authentication Alliance public key, according to another example embodiment.

Turning to FIG. 9, an example embodiment is provided where the LoginID server sends a LID certificate that is chained to an Authentication Alliance Server (AAS) certificate. The AAS certificate wraps the LoginID server public key in a certificate that is signed by the AAS private key. The LoginID server has the LID certificate and the AAS private key stored on the LoginID server. The directory server or the access control server, or both, have access to the AAS public key, which corresponds to the AAS private key.

In particular, the public key of the device authenticator, which is used to verify the device authenticator signature, is not directly accessible to the access control server or the director server, or both. Therefore, the LoginID server, which stores or has access to the public key of the device authenticator, provides the public key of the device authenticator to the access control server. In particular, the LoginID server wraps the public key of the device authenticator in a LID certificate signed by the LoginID server private key.

However, the access control server or the directory server, or both, do not have access to the corresponding LoginID server public key to verify the LID certificate. Therefore, the LoginID server wraps the LoginID server public key in a second certificate, called the AAS certificate, that is signed by the AAS private key. It is appreciated that the AAS certificate is generated by the AAS 112, and the LoginID server obtains and stores the AAS certificate. In this way, the access control server or the directory server, or both, only need access to the AAS public key, which it has obtained.

At Operation 901, this LID certificate, the AAS certificate and a payload is provided in a played to the 3DS client. payload is sent to the service provider server. The payload includes the DA signature, PAN, amount, and risk parameters.

At Operation 903 or at Operation 904, or both, the directory server or the access control server, or both, use the AAS public key to verify the AAS certificate and obtain the LoginID server public key. The LoginID server public key is then used to verify the LID certificate and obtain the device authenticator public key. The device authenticator public key is then used to verify the device authenticator signature. Other transaction confirmation details are also verified. The access control server also processes the risk parameters to identify potential fraudulent activity.

Below are general example embodiments and aspects.

In an example embodiment, a computing system is provided for executing a secure action. The computing system comprises a processor, a communication module, and memory that stores processor executable instructions. The processor executable instructions comprise: obtaining and storing a device authenticator public key that originates from a device authenticator of a user device, the device authenticator public key corresponding to a device authenticator private key; receiving transaction confirmation data that comprises an amount associated with a transaction; generating and sending a transaction confirmation request for the user device; receiving a transaction confirmation response from the user device, the transaction confirmation response comprising a device authentication signature generated by the device authenticator private key; verifying the transaction confirmation response, including verifying the device authentication signature using the device authenticator public key; and generating and transmitting a payload comprising an attestation signature of successfully verifying the transaction confirmation response, the attestation signature generated using at least a private key of the computing system.

In an example aspect, the transaction confirmation response comprises a value derived from the transaction confirmation data that is signed using the device authenticator private key, and the processor executable instructions further comprise verifying the value using the transaction confirmation data.

In another example aspect, the value is a hash of the transaction confirmation data.

In another example aspect, the payload further comprises the transaction confirmation data.

In another example aspect, a Fast Identity Online (FIDO) protocol is used for originating and storing the device authenticator public key and the device authenticator private key; and, the device authenticator public key is a FIDO public key and the device authenticator private key is a FIDO private key.

In another example aspect, the transaction confirmation data further comprises a primary account number.

In another example aspect, after receiving the transaction confirmation data, the processor executable instructions further comprise: generating and sending a transaction ID configured for receipt by the user device, the transaction ID corresponding to the transaction confirmation data; receiving a transaction ID originating from the user device; and, after verifying the transaction ID originating from the user device matches the transaction ID generated by the computing system, generating and sending the traction confirmation request for the user device.

In another example aspect, the transaction confirmation data is transmissible by a service provider server in communication with the user device and the computing system.

In another example aspect, the transaction confirmation data is transmissible by the user device, after a redirect from a service provider server interacting with the user device for the transaction.

In another example aspect, after verifying the transaction confirmation response, the processor executable instructions further comprise generating a transaction confirmation token and transmitting the same to the user device, wherein the transaction confirmation token indicates that the computing system verified the transaction confirmation data.

In an example embodiment, a system is provided for executing a secure action. The system comprises: a user device, a service provider server and an attestation server; the user device comprising a device authenticator that generates a device authenticator private key and a device authenticator public key, wherein the device authenticator private key is stored on the device authenticator and the device authenticator public key is stored on the attestation server; the user device further comprising a user agent to generate and send a transaction request to the service provide server; the service provider server configured to transmit transaction confirmation data to the attestation server after receiving the transaction confirmation request; the attestation server configured to generate and transmit a transaction confirmation request for the user device; the user device configured to activate the device authenticator to obtain user input verification in response to the transaction confirmation request, and, after obtaining the user input verification, the device authenticator generating a transaction confirmation response comprising a device authentication signature signed by the device authenticator private key; the user device configured to transmit the transaction confirmation response to the attestation server; and the attestation server configured to verify the transaction confirmation response, comprising verifying the device authentication signature using the device authenticator public key, and to generate and transmit a payload comprising an attestation signature of successfully verifying the transaction confirmation response, the attestation signature generated using at least a private key of the attestation server.

In an example aspect, the transaction confirmation response comprises a value derived from the transaction confirmation data that is signed using the device authenticator private key, and the attestation server verifying the transaction confirmation response further comprises verifying the value using the transaction confirmation data.

In another example aspect, the payload further comprises the transaction confirmation data.

In another example aspect, a Fast Identity Online (FIDO) protocol is used for originating and storing the device authenticator public key and the device authenticator private key; and, the device authenticator public key is a FIDO public key and the device authenticator private key is a FIDO private key.

In another example aspect, the transaction confirmation data further comprises a primary account number.

In another example aspect, after receiving the transaction confirmation data, the attestation server is further configured to at least: generate and send a transaction ID for receipt by the user device, the transaction ID corresponding to the transaction confirmation data; receive a transaction ID originating from the user device; and, after verifying the transaction ID originating from the user device matches the transaction ID generated by the attestation server, generate and send the transaction confirmation request to the user device.

In another example aspect, after the user device receives the confirmation transaction request, the user agent displays transaction content for review, the transaction content comprising one or more of: name of product or service being purchased, an amount of money, and payment method.

In another example aspect, the device authenticator stores first biometric authentication data; the user device further comprises a scanner configured to obtain the user input verification, the user input verification comprising second biometric authentication data; and, the device authenticator is further configured to compare the second biometric authentication data with the first biometric data.

In another example aspect, the device authenticator is one of: a Trusted Execution Environment (TEE), a secure element, a secure enclave, and a Hardware Secure Module (HSM).

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, EEPROM, flash memory or other memory technology, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the servers or computing devices or nodes, or accessible or connectable thereto. Any application or module herein described may be implemented using computer readable/executable instructions that may be stored or otherwise held by such computer readable media.

It will be appreciated that different features of the example embodiments of the system and methods, as described herein, may be combined with each other in different ways. In other words, different devices, modules, operations, functionality and components may be used together according to other example embodiments, although not specifically stated.

The steps or operations in the flow diagrams described herein are just for example. There may be many variations to these steps or operations according to the principles described herein. For instance, the steps may be performed in a differing order, or steps may be added, deleted, or modified.

It will also be appreciated that the examples and corresponding system diagrams used herein are for illustrative purposes only. Different configurations and terminology can be used without departing from the principles expressed herein. For instance, components and modules can be added, deleted, modified, or arranged with differing connections without departing from these principles.

Although the above has been described with reference to certain specific embodiments, various modifications thereof will be apparent to those skilled in the art without departing from the scope of the claims appended hereto.

The invention claimed is:

1. A system for executing a secure action, the system comprising:
a user device, a service provider server, an attestation server, a client server, a directory server, and an access control server in data communication with a data network;
the user device comprising a device authenticator that comprises a secure execution and secure storage device, the device authenticator configured to generate a device authenticator private key and a device authenticator public key, wherein the device authenticator private key is stored on the device authenticator and the device authenticator public key is stored on the attestation server;
the user device further comprising a user agent, the user agent comprising a web browser or a native application, or both, and the user agent configured to generate and send a transaction request to the service provider server;
the service provider server configured to transmit transaction confirmation data to the attestation server after receiving the transaction request;
the attestation server configured to generate and transmit a transaction confirmation request to the user device;
the user device configured to activate the device authenticator to obtain a user input verification in response to the transaction confirmation request, and, after obtaining the user input verification, the device authenticator configured to generate a transaction confirmation response comprising a device authentication signature signed by the device authenticator private key;
the user device configured to transmit the transaction confirmation response to the attestation server;
the attestation server configured to verify the transaction confirmation response, comprising verifying the device authentication signature using the device authenticator public key; and,
after verifying the transaction confirmation response, the attestation server further configured to redirect the user agent to the service provider server, and the attestation server further configured to generate and transmit a payload to the client server, the payload comprising an attestation signature of successfully verifying the transaction confirmation response, the attestation signature generated using at least a private key of the attestation server;
the client server comprising a merchant plugin, the client server configured to receive the payload from the attestation server and transmit the payload to the directory server;
the directory server comprising a public key of the attestation server and a directory database that includes the access control server, the directory database used to route messages between the merchant plugin and the access control server, and the directory server is configured to, responsive to receiving the payload from the attestation server, use the public key of the attestation server to verify the attestation signature in the payload;
the directory server is further configured to, responsive to verifying the attestation signature, transmit the payload and a verification result to the access control server;
the access control server configured to, responsive to receiving the payload and the verification result from the directory server, generate a reply message; and
the access control server is configured to transmit the reply message to the directory server, the directory server is configured to transmit the reply message to the client server, and the client server is configured to transmit the reply message, which is receivable by the attestation server or the service provider server, or both.

2. The system of claim 1 wherein the client server sends the reply message to the service provider server.

3. The system of claim 1 wherein the attestation server sends the reply message to the service provider server.

4. The system of claim 1 wherein the transaction confirmation response comprises a value derived from the transaction confirmation data that is signed using the device authenticator private key, and the attestation server verifying the transaction confirmation response further comprises verifying the value using the transaction confirmation data.

5. The computing system of claim 4 wherein the value is a hash of the transaction confirmation data.

6. The system of claim 1 wherein the payload further comprises the transaction confirmation data.

7. The system of claim 1 wherein a Fast Identity Online (FIDO) protocol is used for originating and storing the device authenticator public key and the device authenticator private key; and, the device authenticator public key is a FIDO public key and the device authenticator private key is a FIDO private key.

8. The system of claim 1 wherein the transaction confirmation data further comprises a primary account number.

9. The system of claim 1 wherein, after receiving the transaction confirmation data, the attestation server is further configured to at least: generate and send a transaction ID for receipt by the user device, the transaction ID corresponding to the transaction confirmation data; receive a transaction ID originating from the user device; and, after verifying the transaction ID originating from the user device matches the transaction ID generated by the attestation server, generate and send the transaction confirmation request to the user device.

10. The system of claim 1 wherein, after the user device receives the transaction confirmation request, the user agent displays transaction content for review, the transaction content comprising: a name of product or service being purchased, an amount of money, or a payment method, or a combination thereof.

11. The system of claim 1 wherein: the device authenticator stores a first biometric authentication data; the user device further comprises a scanner configured to obtain the user input verification, the user input verification comprising a second biometric authentication data; and, the device authenticator is further configured to compare the second biometric authentication data with the first biometric authentication data.

12. The system of claim 11 wherein the attestation server redirecting the user agent to the service provider server further comprises transmitting via the user agent to the service provider server a transaction confirmation token.

13. The system of claim 12 wherein, after receiving the transaction confirmation token, the service provider server is further configured to transmit the transaction confirmation token to the attestation server, and the attestation server is further configured to verify the transaction confirmation token.

14. A system for executing a secure action, the system comprising:
- a service provider server, an attestation server, a client server, a directory server, and an access control server in data communication with a data network;
- the attestation server configured to store thereon a device authenticator public key, the device authenticator public key corresponding to a device authenticator private key that is storable on a user device;
- the service provider server configured to receive a transaction request that is transmittable from the user device, and the service provider server further configured to transmit transaction confirmation data to the attestation server after receiving the transaction request;
- the attestation server configured to generate and transmit a transaction confirmation request, which is transmittable to the user device;
- the attestation server configured to receive a transaction confirmation response that comprises a device authentication signature, which is transmittable by the user device, and the attestation server further configured to verify the transaction confirmation response which comprises verifying the device authentication signature using the device authenticator public key; and,
- after verifying the transaction confirmation response, and the attestation server further configured to generate and transmit a payload to the client server, the payload comprising an attestation signature of successfully verifying the transaction confirmation response, the attestation signature generated using at least a private key of the attestation server;
- the client server comprising a merchant plugin, the client server configured to receive the payload from the attestation server and transmit the payload to the directory server;
- the directory server comprising a public key of the attestation server and a directory database that includes the access control server, the directory database used to route messages between the merchant plugin and the access control server, and the directory server is configured to, responsive to receiving the payload from the attestation server, use the public key of the attestation server to verify the attestation signature in the payload;
- the directory server is further configured to, responsive to verifying the attestation signature, transmit the payload and a verification result to the access control server;
- the access control server configured to, responsive to receiving the payload and the verification result from the directory server, generate a reply message; and
- the access control server is configured to transmit the reply message to the directory server, the directory server is configured to transmit the reply message to the client server, and the client server is configured to transmit the reply message, which is receivable by the attestation server or the service provider server, or both.

15. The system of claim 14 wherein the client server sends the reply message to the service provider server.

16. The system of claim 14 wherein the attestation server sends the reply message to the service provider server.

17. The system of claim 14 wherein the transaction confirmation response comprises a value derived from the transaction confirmation data that is signed using the device authenticator private key, and the attestation server verifying the transaction confirmation response further comprises verifying the value using the transaction confirmation data.

18. The computing system of claim 17 wherein the value is a hash of the transaction confirmation data.

19. The system of claim 14 wherein the payload further comprises the transaction confirmation data.

20. The system of claim 14 wherein a Fast Identity Online (FIDO) protocol is used for originating and storing the device authenticator public key and the device authenticator private key; and, the device authenticator public key is a FIDO public key and the device authenticator private key is a FIDO private key.

21. The system of claim 14 wherein the transaction confirmation data further comprises a primary account number.

22. The system of claim 14 wherein, after receiving the transaction confirmation data, the attestation server is further configured to at least: generate and send a transaction ID that is receivable by the user device, the transaction ID corresponding to the transaction confirmation data; receive a transaction ID that is transmittable by the user device; and, after verifying the transaction ID transmittable by the user device matches the transaction ID generated by the attestation server, generate and send the transaction confirmation request that is transmittable to the user device.

* * * * *